(12) United States Patent
Wang et al.

(10) Patent No.: US 10,609,379 B1
(45) Date of Patent: Mar. 31, 2020

(54) VIDEO COMPRESSION ACROSS CONTINUOUS FRAME EDGES

(71) Applicant: Amazon Technologies, Inc., Seattle, WA (US)

(72) Inventors: Qi Keith Wang, Cambridge (GB); Ilya Vladimirovich Brailovskiy, Mountain View, CA (US); Naushirwan Navroze Patuck, Cambridge (GB)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 749 days.

(21) Appl. No.: 14/842,558

(22) Filed: Sep. 1, 2015

(51) Int. Cl.
| | |
|---|---|
| H04N 19/139 | (2014.01) |
| H04N 19/23 | (2014.01) |
| H04N 19/61 | (2014.01) |
| H04N 19/176 | (2014.01) |
| H04N 19/182 | (2014.01) |
| H04N 19/14 | (2014.01) |

(52) U.S. Cl.
CPC ......... H04N 19/139 (2014.11); H04N 19/14 (2014.11); H04N 19/176 (2014.11); H04N 19/182 (2014.11); H04N 19/23 (2014.11); H04N 19/61 (2014.11)

(58) Field of Classification Search
CPC .... H04N 19/139; H04N 19/14; H04N 19/176; H04N 19/182; H04N 19/23; H04N 19/61
USPC ..................................................... 375/24.16
See application file for complete search history.

(56) References Cited

U.S. PATENT DOCUMENTS

| | | | |
|---|---|---|---|
| 6,192,393 B1 | 2/2001 | Tarantino et al. | |
| 6,788,333 B1 | 9/2004 | Uyttendaele et al. | |
| 9,111,138 B2* | 8/2015 | Kirby | G06F 3/017 |
| 9,582,731 B1* | 2/2017 | Butko | G06K 9/00664 |
| 2002/0021353 A1 | 2/2002 | DeNies | |
| 2002/0049979 A1 | 4/2002 | White et al. | |
| 2004/0030527 A1 | 2/2004 | Rankin | |
| 2004/0032495 A1 | 2/2004 | Ortiz | |
| 2005/0002535 A1 | 1/2005 | Liu et al. | |

(Continued)

FOREIGN PATENT DOCUMENTS

WO WO-2006016783 A1 * 2/2006 ......... H04N 5/23238

OTHER PUBLICATIONS

Author Unknown, "ITU-T H.263 (Windows Drivers)," Available at: https://msdn.microsoft.com/enus/library/windows/hardware/ff568162(v=vs .85).aspx, 3 pages (printed Jun. 19, 2015).

(Continued)

*Primary Examiner* — Rebecca A Volentine
*Assistant Examiner* — Jimmy S Lee
(74) *Attorney, Agent, or Firm* — K&L Gates LLP

(57) ABSTRACT

Various examples are directed to methods and systems for compressing panoramic video. An image processor may receive a frame comprising a plurality of pixel values arranged according to a two-dimensional grid and divide the frame into a plurality of pixel blocks comprising a first pixel block and a second pixel block. The first pixel block may be positioned in a first edge column adjacent a first edge of the frame and the second pixel block may be positioned in a second edge column adjacent a second edge of the frame opposite the first edge. The image processor may identify a spatial continuity between the first pixel block and the second pixel block and replace the first pixel block with a reference to the second pixel block.

17 Claims, 9 Drawing Sheets

(56) References Cited

U.S. PATENT DOCUMENTS

| | | | |
|---|---|---|---|
| 2005/0207664 A1* | 9/2005 | Ramasastry | H04N 19/63 382/240 |
| 2005/0280701 A1 | 12/2005 | Wardell | |
| 2006/0034374 A1* | 2/2006 | Park | G06T 7/20 375/240.16 |
| 2007/0035612 A1 | 2/2007 | Korneluk et al. | |
| 2009/0225845 A1* | 9/2009 | Veremeev | H04N 5/145 375/240.16 |
| 2009/0284601 A1 | 11/2009 | Eledath et al. | |
| 2010/0034425 A1 | 2/2010 | Lin et al. | |
| 2010/0050221 A1 | 2/2010 | McCutchen et al. | |
| 2010/0299630 A1 | 11/2010 | McCutchen et al. | |
| 2011/0214072 A1 | 9/2011 | Lindemann et al. | |
| 2012/0057852 A1 | 3/2012 | Devleeschouwer et al. | |
| 2012/0210252 A1 | 8/2012 | Fedoseyeva et al. | |
| 2013/0070047 A1 | 3/2013 | DiGiovanni et al. | |
| 2014/0059166 A1 | 2/2014 | Mann et al. | |
| 2014/0140633 A1 | 5/2014 | Wang et al. | |
| 2014/0340427 A1* | 11/2014 | Baker | G06T 3/0062 345/641 |
| 2015/0103197 A1 | 4/2015 | Djordjevic et al. | |
| 2015/0110404 A1 | 4/2015 | Cho et al. | |
| 2015/0116547 A1 | 4/2015 | Laroia | |
| 2016/0007025 A1* | 1/2016 | Kaya | H04N 19/159 375/240.13 |
| 2016/0191802 A1 | 6/2016 | Martinello | |

OTHER PUBLICATIONS

Wiegand, "Overview of the H.264/AVC Video Coding Standard," IEEE Transactions on Circuits and Systems for Video Technology, vol. 13, No. 7 pp. 560-576 (Jul. 2003).

* cited by examiner

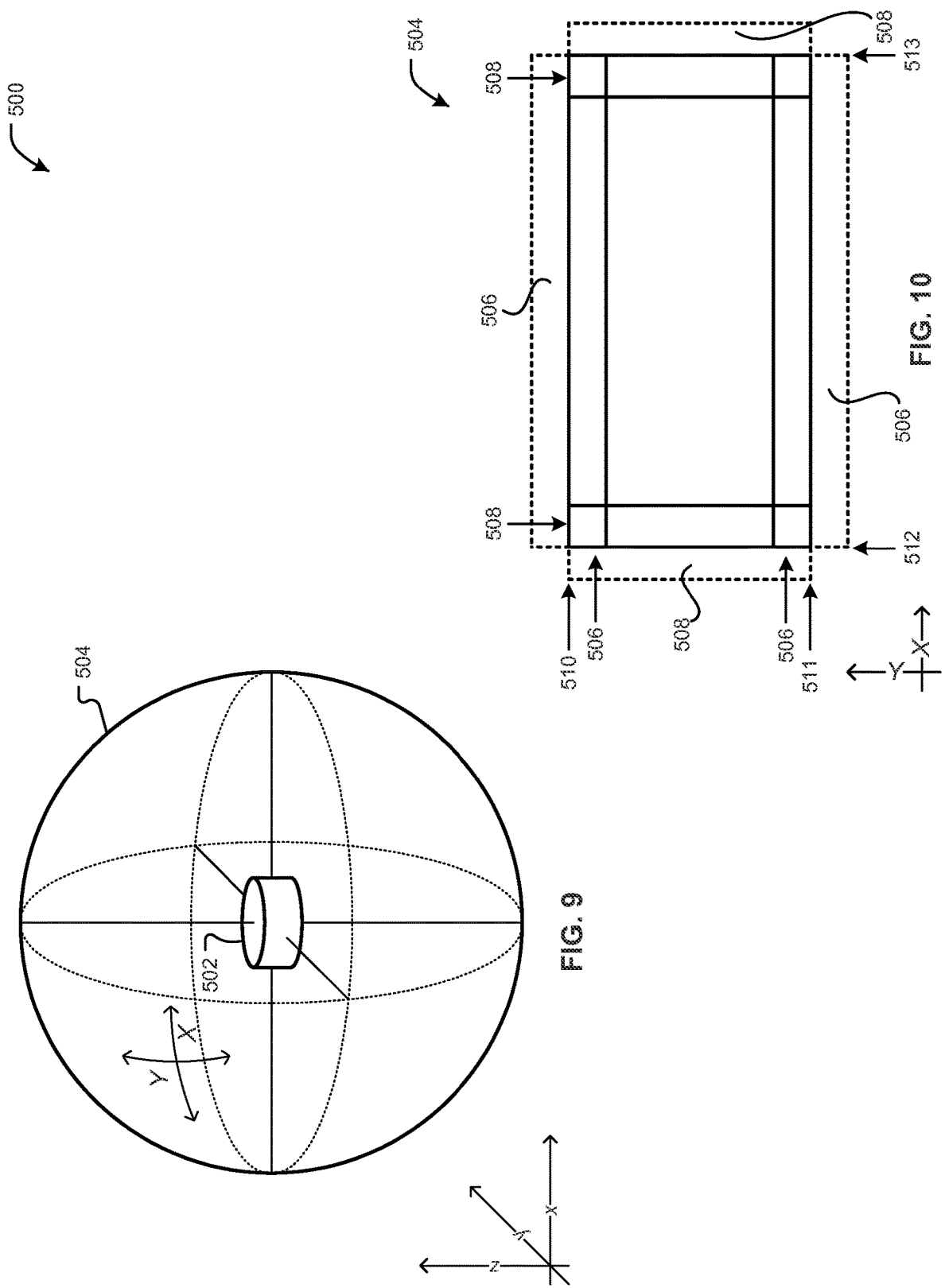

VIDEO COMPRESSION ACROSS CONTINUOUS FRAME EDGES

BACKGROUND

Video compression techniques are used to reduce the size of video files, often for storage or transmission. Many common video compression techniques result in a data set typically smaller than the data set describing the original pixel values. Thus, the overall size of the video is reduced.

BRIEF DESCRIPTION OF DRAWINGS

FIG. 9 shows an environment comprising a panoramic camera for capturing panoramic video with frames continuous in two dimensions.

FIG. 10 is a diagram showing a flattened view of the frame.

DETAILED DESCRIPTION

In the following description, reference is made to the accompanying drawings, which illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Various examples described herein are directed to systems and methods for compressing panoramic video. A panoramic video may include a set of frames captured by a panoramic camera system. Each frame may include a set of pixel values representing a scene captured by the panoramic camera system. Each pixel value of a frame may be described by a unique position on a two-dimensional grid. The position of a pixel value on the two-dimensional grid may correspond to the spatial position of a portion of the depicted scene represented by the pixel value. In some examples, each pixel value corresponds to the output from one pixel element of an image sensor of the panoramic system. For example, when the panoramic camera system includes a single image sensor, a pixel value may represent the output of one pixel element from the image sensor. In other examples, pixel values may not directly correspond to the output of a single pixel element. For example, when the panoramic camera system includes multiple image sensors, some pixel elements may represent a combination of outputs from pixel elements from different (e.g., adjacent) image sensors. Also, for example, when the panoramic frame is subject to various processing, such as compression, resolution modification, etc., pixel values may not directly correspond to the output of a single pixel element from an image sensor.

Figure 1:
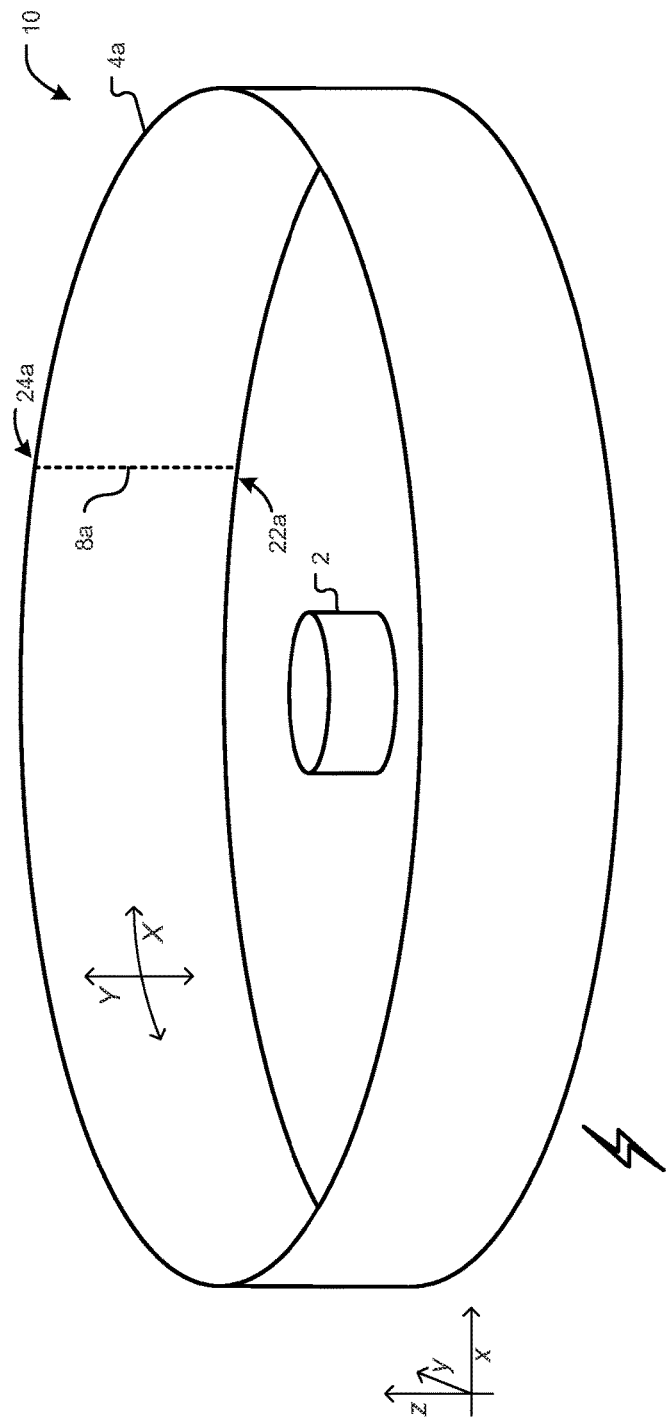
FIG. 1 is a diagram showing one example of an environment for compressing panoramic video.
Figure 2:
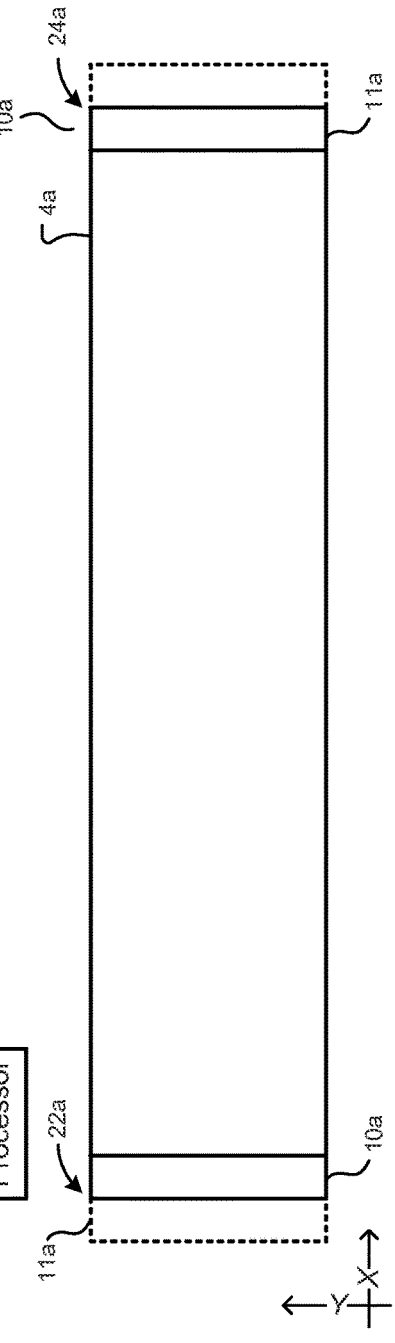
FIG. 2 is a diagram showing a flattened view of the example frame of FIG. 1.

FIG. 1 is a diagram showing one example of an environment 10 for compressing panoramic video including an example frame 4a. The environment 10 includes a panoramic camera 2 and an image processor 6 in communication with the panoramic camera 2. The panoramic camera 2 captures the frame 4a. The frame 4a, for example, may be a projection of a three-dimensional camera space onto a two-dimensional frame space or grid. In FIG. 1, the three-dimensional camera space is described by a Cartesian coordinate system having three mutually orthogonal axes, x, y, and z, although any suitable coordinate system may be used. The grid of the two-dimensional frame space is also described by a Cartesian coordinate system having two orthogonal axes, X and Y, although any suitable two-dimensional coordinate system may be used. Pixel values in the frame 4a may be described by a position in the X and Y dimensions. FIG. 2 is a diagram showing a flattened view of the frame 4a. In the example of FIGS. 1 and 2, the frame 4a is continuous in the X-direction. For example, pixel values at edges 22a, 24a of the frame 4a depict adjacent portions of the scene captured by the panoramic camera 2. This is illustrated in FIG. 1 as, in the camera space, the edges 22a, 24a are adjacent to one another next to a seam 8a. The seam 8a indicates where the frame 4a is split in frame space and also shows opposite edges of the two-dimensional grid. The example frame 4a is discontinuous in the Y direction. For example, pixel values at the top and bottom of the frame 4a do not depict adjacent portions of the camera space.

Figure 3:
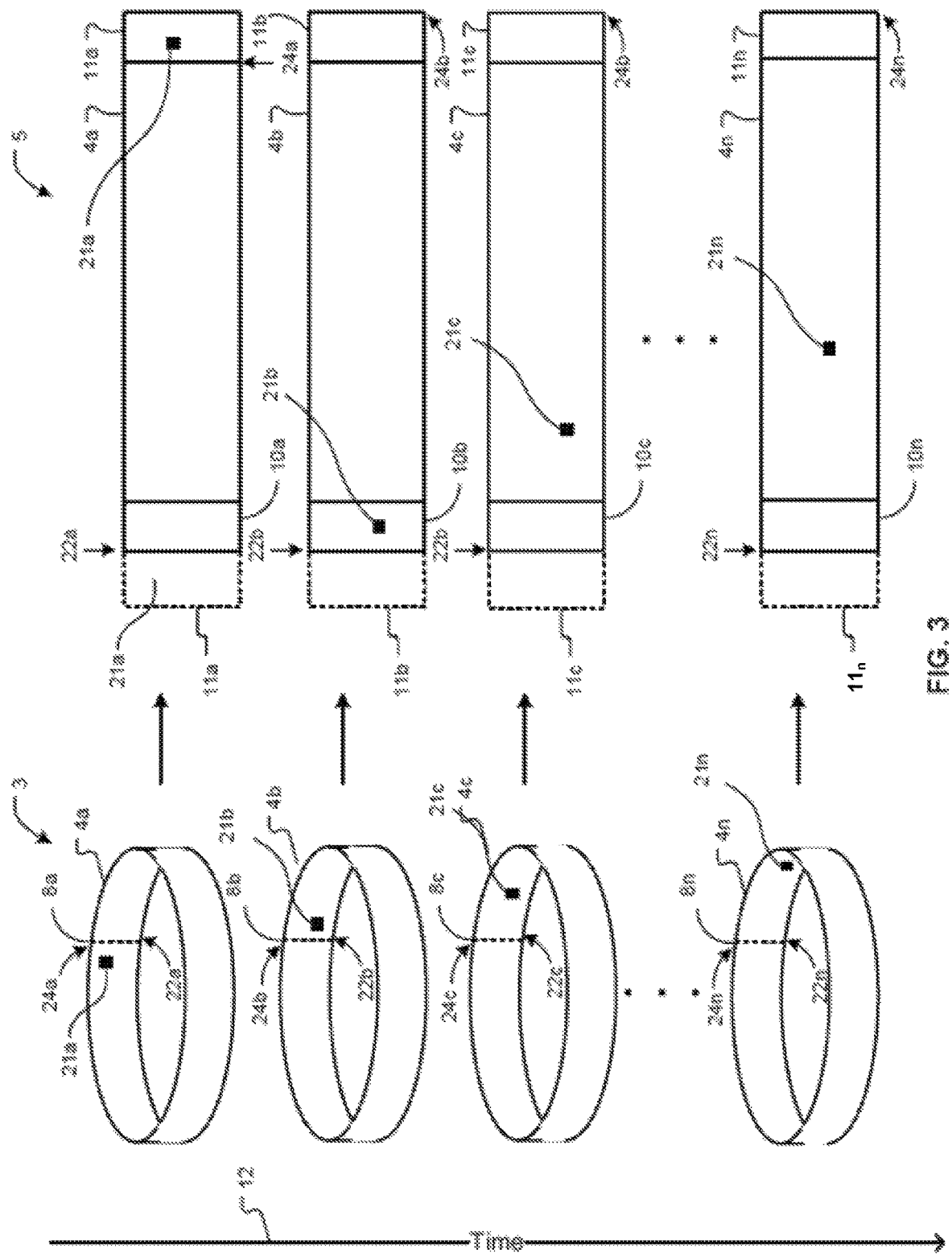
FIG. 3 shows one example of a temporal sequence of frames for a panoramic video.

While FIGS. 1 and 2 show a single panoramic frame 4a, a panoramic video typically comprises a set of frames captured sequentially over a period of time. For example, FIG. 3 shows one example of a temporal sequence of frames including frames 4a, 4b, 4c, 4n for a panoramic video. Each frame 4a, 4b, 4c, 4n of the panoramic video may be continuous in at least one dimension. FIG. 3 includes a first column 3 showing the frames 4a, 4b, 4c, 4n positioned in the three-dimensional camera space. A second column 5 shows flattened views of the frames 4a, 4b, 4c, 4n. In both columns 3, 5 the frames 4a, 4b, 4c, 4n are positioned according to a temporal sequence of the panoramic video. The temporal sequence of the panoramic video indicates a temporal order in which the frames 4a, 4b, 4c, 4n were captured and also indicates the order in which the frames may be played-back to display the video in order. For example, in FIG. 3, the temporal sequence of the frames 4a, 4b, 4c 4n is indicated by the time axis 12. In some examples, each frame 4a, 4b, 4c, 4n may be described by a timestamp indicating a time when the frame 4a, 4b, 4c, 4n was captured. For example, according to the temporal sequence, the frames 4a, 4b, 4c, 4n may be ordered by increasing time stamps. Although four frames 4a, 4b, 4c, 4n are shown in FIG. 3, panoramic videos may include large numbers of frames. Any suitable frame rate may be used for panoramic videos including, for example, 30 frames per second (fps), 60 fps, 120 fps, and higher. Also, some examples may have frame rates less than 30 fps such as, for example, frame rates down to and including 1 fps or less. Examples utilizing lower frame rates (e.g., less than 30 fps) may include security cameras, camera systems with low battery drain settings, etc. As shown in column 3, each of the frames 4a, 4b, 4c, 4n may be captured by the same panoramic camera system 2, albeit at different points in time 12 (e.g., different positions in the temporal sequence of the video). Accordingly, the frames 4a, 4b, 4c, 4n may depict a common position in the three-dimensional camera space (e.g., if the camera 2 is not moving). As a result, edges 22a, 22b, 22c, 22n of frames at different points of the temporal sequence may have equivalent positions on the two-dimensional grid. For example, pixel values at or near the edges 22a, 22b, 22c, 22n may have been captured by the same pixel elements of the panoramic camera system 2. Similarly, pixel values at or near the edges 24a, 24b, 24c, 24n may have equivalent positions on the two-dimensional grid.

The image processor 6 (FIG. 1) may be programmed to exploit the continuous dimension of the frames 4a, 4b, and 4c to compress the frames. For example, because the frames 4a, 4b, 4c, 4n are continuous in the X-dimension, spatial continuity features within a single frame may extend across the frame edges. According, the image processor 6 may be programmed to identify spatial continuity features across the edges of a frame (e.g., cross-edge spatial continuity features). A spatial continuity feature may be a set of similar pixel values that are adjacent and/or near one another. For example, a similar set of pixel values may depict the same object or a similar object from the camera space. Also, because the frames 4a, 4b, 4c, 4n are continuous in the X-dimension and depict the same projection of the three-dimensional camera space onto the two-dimensional frame space, motion originating at or near one edge of a frame 4a, 4b, 4c, 4n may cross that edge to terminate at or near the opposite edge of another frame 4a, 4b, 4c, 4n. Accordingly, the image processor 6 may be programmed to identify motion vectors between frames 4a, 4b, 4c, 4n and also across frame edges (e.g., cross-edge motion vectors). Motion vectors may be data pointing from one position (an originating position) to another position (a terminating position) in a way that indicates motion between the two positions. The originating and terminating positions may be pixel values or groupings of pixel values, such as pixel blocks. In some examples, the originating position is in a first frame while the terminating position is in another frame (e.g., prior to or subsequent to the first frame according to a temporal sequence of the panoramic video).

In some examples, the image processor 6 may identify cross-edge compression features by considering pixel values at or near an edge of a frame at both sides of the frame. For example, frame 4a is illustrated with an edge column 10a that is adjacent edge 22a and an edge column 11a that is adjacent edge 24a. Similarly, frames 4b, 4c, 4n comprise edge columns 10b, 10c, 10n and 11b, 11c, 11n. The image processor 6 may be programmed to identify spatial continuity features with the edge column 11a to be both at its actual position in the frame space (e.g., near the edge 24a) and also adjacent the edge column 10a (indicated in the dotted from in FIG. 2). In this way, the image processor 6 may identify any spatial continuities shown between pixel values or pixel blocks in the two edge columns 10a, 11a. In some examples, the image processor 6 may obtain a similar result by considering the edge column 10a both at its actual position in the frame space (e.g., near the edge 22a) and also adjacent the edge column 11a.

The image processor 6 may utilize a similar technique to identify cross-edge motion vectors. For example, the frames 4a, 4b, 4c, 4n, as illustrated in FIG. 3 depict an object appearing at different positions 21a, 21b, 21c, 21n in each of the frames 4a, 4b, 4c, 4n. The object may represent a physical object moving in the three-dimensional camera space and/or a grouping of similar pixel values. In frame 4a, the object is at position 21a, which is to the left of the seam 8a and edge 24a. As shown in column 5, the position 21a may fall within the edge column 11a. In frame 4b, the object is at position 21b. Position 21b is to the right of the seam 8b and the edge 22b. As shown in column 5, the position 21b may fall within the edge column 10b. Positions 21c, 21n of the object in the subsequent frames are to the right of the seams 8c, 8n and edges 22c, 22n. In this example, the image processor 6 may identify a cross-edge motion vector between the positions 21a and 21b. The motion vector between positions 21a and 21b may be considered cross-edge because it crosses edges 22a, 22b having equivalent positions on the two-dimensional grid.

The image processor 6 may utilize cross-edge spatial continuities and/or cross-edge motion vectors to compress the frames 4a, 4b, 4c, 4n. For example, cross-edge spatial continuities may be used to generate intra-coded picture ("i-frames") compression of a frame or frames 4a, 4b, 4c, 4n. For example, referring to FIG. 2, the image processor 6 may replace one or more pixel values from the column 10a of pixel values with a reference to one or more pixel values from the column 11a of pixel values when compressing the video file. A more detailed example demonstrating spatial continuities across frame edges is provided herein with respect to FIG. 6. In some examples, the image processor 6 may utilize cross-edge motion vectors to generate predicted picture ("p-frames") or bi-predicted picture ("b-frames") compression of a frame or frames 4a, 4b, 4c, 4n. For example, the image processor 6 may replace one or more pixel values of the subject frame (e.g., pixel values at position 21b) with a reference to one or more pixel values of the reference frame (e.g., pixel values at position 21a). Additional examples utilizing b-frames and/or p-frames compression are described herein with respect to FIG. 7.

Figure 4:
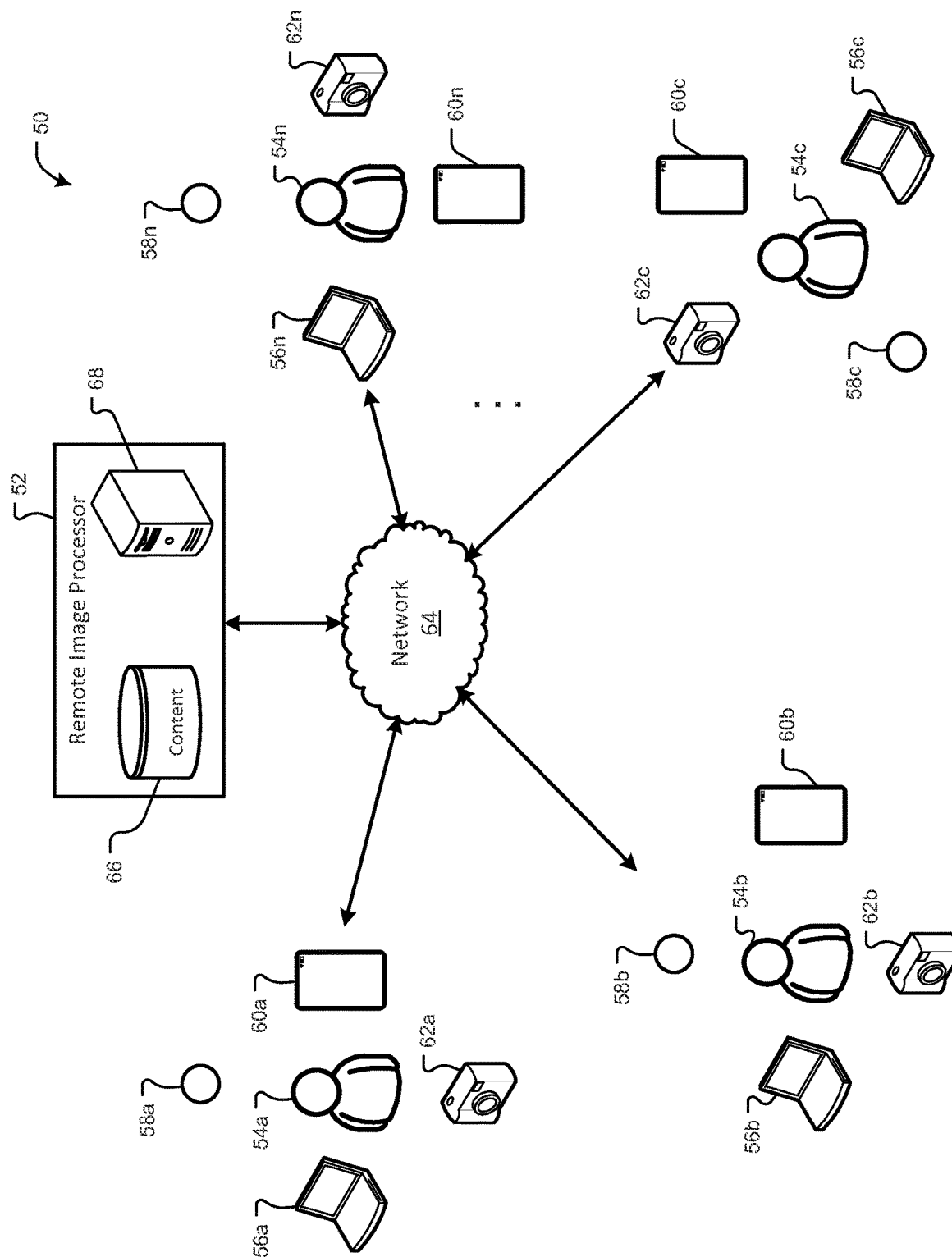
FIG. 4 is a diagram showing another example of an environment including various devices for capturing and compressing panoramic videos.

Video compression, as described herein, may be performed utilizing any suitable device or devices. In some examples, the panoramic camera, such as the panoramic camera 2, may comprise an internal image processor similar to the image processor 6 that performs video compression and provides compressed videos for playback. Also, in some examples, an image processor similar to the image processor 6 may be external to the camera and may be implemented, for example, by another local device and/or at a remote location. FIG. 4 is a diagram showing another example of an environment 50 including various devices for capturing and compressing panoramic videos. The environment 50 comprises a remote image processor 52 and users 54a, 54b, 54c, 54n. Each user 54a, 54b, 54c, 54n may use one or more user devices such as, for example, panoramic cameras 58a, 58b, 58c, 58n, digital cameras 62a, 62b, 62c, 62n, mobile devices 60a, 60b, 60c, 60n, or other computing devices 56a, 56b, 56c, 56n. Although four users 54a, 54b, 54c, 54n are shown, any suitable number of users 54a, 54b, 54c, 54n may be part of the environment. Also, although each user 54a, 54b, 54c, 54n shown in FIG. 2 is associated with a panoramic camera 58a, 58b, 58c, 58n, a mobile device 60a, 60b, 60c, 60n, a digital camera 62a, 62b, 62c, 62n and a computing device 56a, 56b, 56c, 56n, some users 54a, 54b, 54c, 54n may use additional user devices and/or fewer user devices than what is shown.

User devices may be utilized to capture videos, transmit videos to the remote image processor 52, and/or perform video compression as described herein. Panoramic cameras 58a, 58b, 58c, 58n may include one or more image sensors and associated optics to capture panoramic videos. Panoramic cameras 58a, 58b, 58c, 58n may have a panoramic field of view larger than that of a standard camera. For example, panoramic cameras 58a, 58b, 58c, 58n may have a field of view of about 180° or greater. Some panoramic cameras 58a, 58b, 58c, 58n may have a field of view as large as 360° and/or 4π steradians. In some examples, a panoramic camera 58a, 58b, 58c, 58n may comprise a single image sensor with lenses, mirrors or other optics allowing the single image sensor to receive electromagnetic radiation (e.g., light) from the panaromic field of view. In some examples, a panoramic camera 58a, 58b, 58c, 58n may comprise multiple image sensors (e.g., with overlapping fields of view). The panoramic camera 58a, 58b, 58c, 58n (or another component of the environment 50) may be configured to stitch frames from the respective image sensors into a single panoramic frame. In some examples, a panoramic camera 58a, 58b, 58c, 58n may be configured to communicate with other components of the environment 50 utilizing, for example, a wired or wireless connection. For example, a panoramic camera 58a, 58b, 58c, 58n may upload a frame or frames to a mobile device 60a, 60b, 60c, 60n or computing device 56a, 56b, 56c, 56n via a wired connection, such as Universal Serial Bus (USB), or wireless connection, such as near field communication (NFC) or Bluetooth™. In some examples, a panoramic camera 58a, 58b, 58c, 58n may be configured to upload video directly to a remote image processor 52, for example, via the network 64. Also, in some examples, a panoramic camera 58a, 58b, 58c, 58n may comprise a processor and/or other components to implement an image processor (e.g., for de-blurring, as described herein).

Digital cameras 62a, 62b, 62c, 62n may comprise any suitable device with one or more image sensors to capture an image and/or video. In some examples, digital cameras 62a, 62b, 62c, 62n may be configured to communicate with other components of the environment 50 utilizing, for example, a wired or wireless connection. For example, a digital camera 62a, 62b, 62c, 62n may upload images and/or videos to a mobile device 60a, 60b, 60c, 60n or computing device 56a, 56b, 56c, 56n via a wired connection, such as Universal Serial Bus (USB), or wireless connection, such as near field communication (NFC) or Bluetooth™. In some examples, a digital camera 62a, 62b, 62c, 62n may be configured to upload images and/or video directly to a remote image processor 52, for example, via the network 64. Also, in some examples, a digital camera 62a, 62b, 62c, 62n may comprise a processor and/or other components to implement video compression, as described herein. Digital cameras 62a, 62b, 62c, 62n may have a standard or panoramic field-of-view. For example, some aspects of video compression described herein may be performed on videos having a standard or panoramic field-of-view.

A mobile device 60a, 60b, 60c, 60n may be any suitable type of computing device comprising a processor and data storage. In some examples, a mobile device 60a, 60b, 60c, 60n may be configured to receive video captured by a panoramic camera 58a, 58b, 58c, 58n or digital camera 62a, 62b, 62c, 62n and transfer the video for compression at the remote image processor 52. In some examples, a mobile device 60a, 60b, 60c, 60n may execute an image processor for compressing videos received, for example, from a panoramic camera 58a, 58b, 58c, 58n or digital camera 62a, 62b, 62c, 62n. Also, in some examples, a mobile device 60a, 60b, 60c, 60n may comprise one or more image sensors and associated optics for capturing video and either uploading the video to the remote image processor 52 or performing compression, described herein. In some examples, a mobile device 60a, 60b, 60c, 60n may be configured to communicate on a cellular or other telephone network in addition or instead of the network 64.

A computing device 56a, 56b, 56c, 56n may be any suitable type of computing device comprising a processor and data storage including, for example, a laptop computer, a desktop computer, etc. In some examples, a computing device 56a, 56b, 56c, 56n may be configured to receive videos captured by a panoramic camera 58a, 58b, 58c, 58n or digital camera 62a, 62b, 62c, 62n and transfer the videos for compression at the remote image processor 52. In some examples, a computing device 56a, 56b, 56c, 56n may be configured to execute an image processor for compressing videos received, for example, from a panoramic camera 58a, 58b, 58c, 58n or digital camera 62a, 62b, 62c, 62n. Also, in some examples, a computing device 56a, 56b, 56c, 56n may comprise one or more image sensors and associated optics for capturing video and either uploading the video to the remote image processor 52 or performing compression locally.

The optional remote image processor 52 may perform video compression on videos received from users 54a, 54b, 54c, 54n (e.g., user devices associated with the user). The remote image processor 52 may comprise one or more data stores 66 and one or more servers 68. The data store 66 may store videos received from the various user devices, motion kernels, and/or other data associated with de-blurring. The various components 68, 66 of the remote image processor 52 may be at a common geographic location and/or may be distributed across multiple geographic locations. For example, the remote image processor 52 may be implemented in whole or in part as a cloud or Software as a Service (SaaS) system. In some examples, the remote image processor 52 may perform video compression on videos received from multiple different users 54a, 54b, 54c, 54n (e.g., via their associated cameras, computing devices, or other devices). The various components of the environment 50 may be in communication with one another via a network 64. The network 64 may be and/or comprise any suitable wired or wireless network configured according to any suitable architecture or protocol. In some examples, the network 64 may comprise the Internet.

Figure 5:
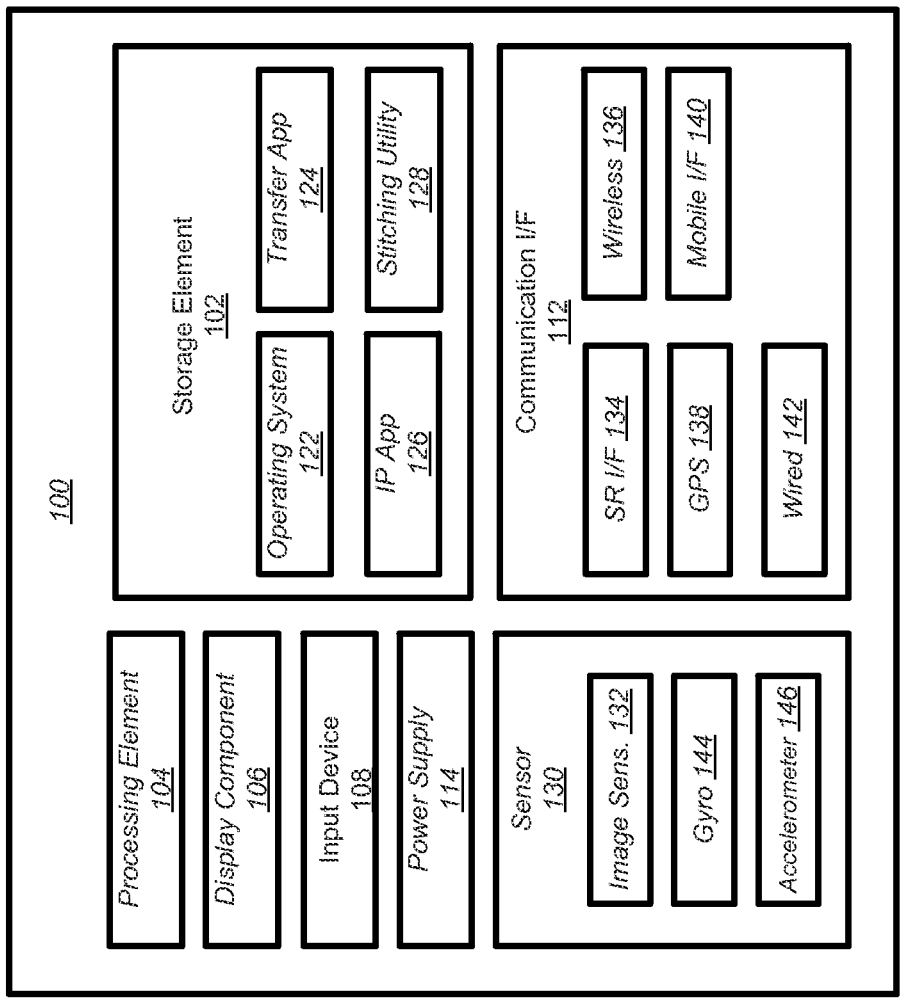
FIG. 5 is a block diagram showing an example architecture of a user device, such as the panoramic cameras, digital cameras, mobile devices and other computing devices described herein.

FIG. 5 is a block diagram showing an example architecture 100 of a user device, such as the panoramic cameras, digital cameras, mobile devices and other computing devices described herein. It will be appreciated that not all user devices will include all of the components of the architecture 100 and some user devices may include additional components not shown in the architecture 100. The architecture 100 may include one or more processing elements 104 for executing instructions and retrieving data stored in a storage element 102. The processing element 104 may comprise at least one processor. Any suitable processor or processors may be used. For example, the processing element 104 may comprise one or more digital signal processors (DSPs). The storage element 102 can include one or more different types of memory, data storage or computer readable storage media devoted to different purposes within the architecture 100. For example, the storage element 102 may comprise flash memory, random access memory, disk-based storage, etc. Different portions of the storage element 102, for example, may be used for program instructions for execution by the processing element 104, storage of images or other digital works, and/or a removable storage for transferring data to other devices, etc.

The storage element 102 may also store software for execution by the processing element 104. An operating system 122 may provide the user with an interface for operating the user device and may facilitate communications and commands between applications executing on the architecture 100 and various hardware thereof. A transfer application 124 may be configured to receive video from another device (e.g., a panoramic camera or digital camera) or from an image sensor 132 included in the architecture 100. In some examples, the transfer application 124 may also be configured to upload the received videos to another device that may perform compression as described herein (e.g., a mobile device, another computing device, or a remote image processor 52). In some examples, an image processor application 126 may perform compression on videos received from an image sensor of the architecture 100 and/or from another device. The image processor application 126 may be included, for example, at a panoramic camera, a digital camera, a mobile device or another computer system. In some examples, where compression is performed by a remote image processor 52 or another component of the environment 50, the image processor application 126 may be omitted. A stitching utility 128 may stitch videos received from multiple image sensors into a single image and/or video. The stitching utility 128 may be included, for example, in a panoramic camera and/or a mobile device or other computing device receiving input from a panoramic camera.

When implemented in some user devices, the architecture 100 may also comprise a display component 106. The display component 106 may comprise one or more light emitting diodes (LEDs) or other suitable display lamps. Also, in some examples, the display component 106 may comprise, for example, one or more devices such as cathode ray tubes (CRTs), liquid crystal display (LCD) screens, gas plasma-based flat panel displays, LCD projectors, or other types of display devices, etc.

The architecture 100 may also include one or more input devices 108 operable to receive inputs from a user. The input devices 108 can include, for example, a push button, touch pad, touch screen, wheel, joystick, keyboard, mouse, trackball, keypad, light gun, game controller, or any other such device or element whereby a user can provide inputs to the architecture 100. These input devices 108 may be incorporated into the architecture 100 or operably coupled to the architecture 100 via wired or wireless interface. When the display component 106 includes a touch sensitive display, the input devices 108 can include a touch sensor that operates in conjunction with the display component 106 to permit users to interact with the image displayed by the display component 106 using touch inputs (e.g., with a finger or stylus). The architecture 100 may also include a power supply 114, such as a wired alternating current (AC) converter, a rechargeable battery operable to be recharged through conventional plug-in approaches, or through other approaches such as capacitive or inductive charging.

The architecture 100 may also include a communication interface 112, comprising one or more wired or wireless components operable to communicate with one or more other user devices and/or with the remote image processor 52. For example, the communication interface 112 may comprise a wireless communication module 136 configured to communicate on a network, such as the network 64, according to any suitable wireless protocol, such as IEEE 802.11 or another suitable wireless local area network WLAN protocol. A short range interface 134 may be configured to communicate using one or more short range wireless protocols such as, for example, near field communications (NFC), Bluetooth™, Bluetooth LE™, etc. A mobile interface 140 may be configured to communicate utilizing a cellular or other mobile protocol. A Global Positioning System (GPS) module 138 may be in communication with one or more earth-orbiting satellites or other suitable position-determining systems to identify a position of the architecture 100. A wired communication module 142 may be configured to communicate according to the Universal Serial Bus (USB) protocol or any other suitable protocol.

The architecture 100 may also include one or more sensors 130, such as, for example, one or more image sensors and one or more motion sensors. An image sensor 132 is shown in FIG. 5. Some examples of the architecture 100 may include multiple image sensors 132. For example, a panoramic camera may comprise multiple image sensors 132 resulting in multiple video frames that may be stitched to form a panoramic output. Motion sensors may include any sensors that sense motion of the architecture including, for example, gyro sensors 144 and accelerometers 146. Motion sensors, in some examples, may be included in user devices, such as panoramic cameras, digital cameras, mobile devices, etc., that capture video to be compressed. The gyro sensor 144 may be configured to generate a signal indicating rotational motion and/or changes in orientation of the architecture (e.g., a magnitude and/or direction of the motion or change in orientation). Any suitable gyro sensor may be used including, for example, ring laser gyros, fiber-optic gyros, fluid gyros, vibration gyros, etc. The accelerometer 146 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 138 may be utilized as a motion sensor. For example, changes in the position of the architecture 100, as determined by the GPS interface 138, may indicate the motion of the GPS interface 138. Other types of motion sensors that may be included in the architecture 100 including digital compass sensors, other location sensors (e.g., utilizing beacon signals or time stamps to determine a current or past location of the architecture), time-of-flight or other depth sensors, etc. In some examples, an image sensor may also be a motion sensor. For example, frames captured by an image sensor may be analyzed to determine a direction and magnitude of the camera's motion.

Figure 6:
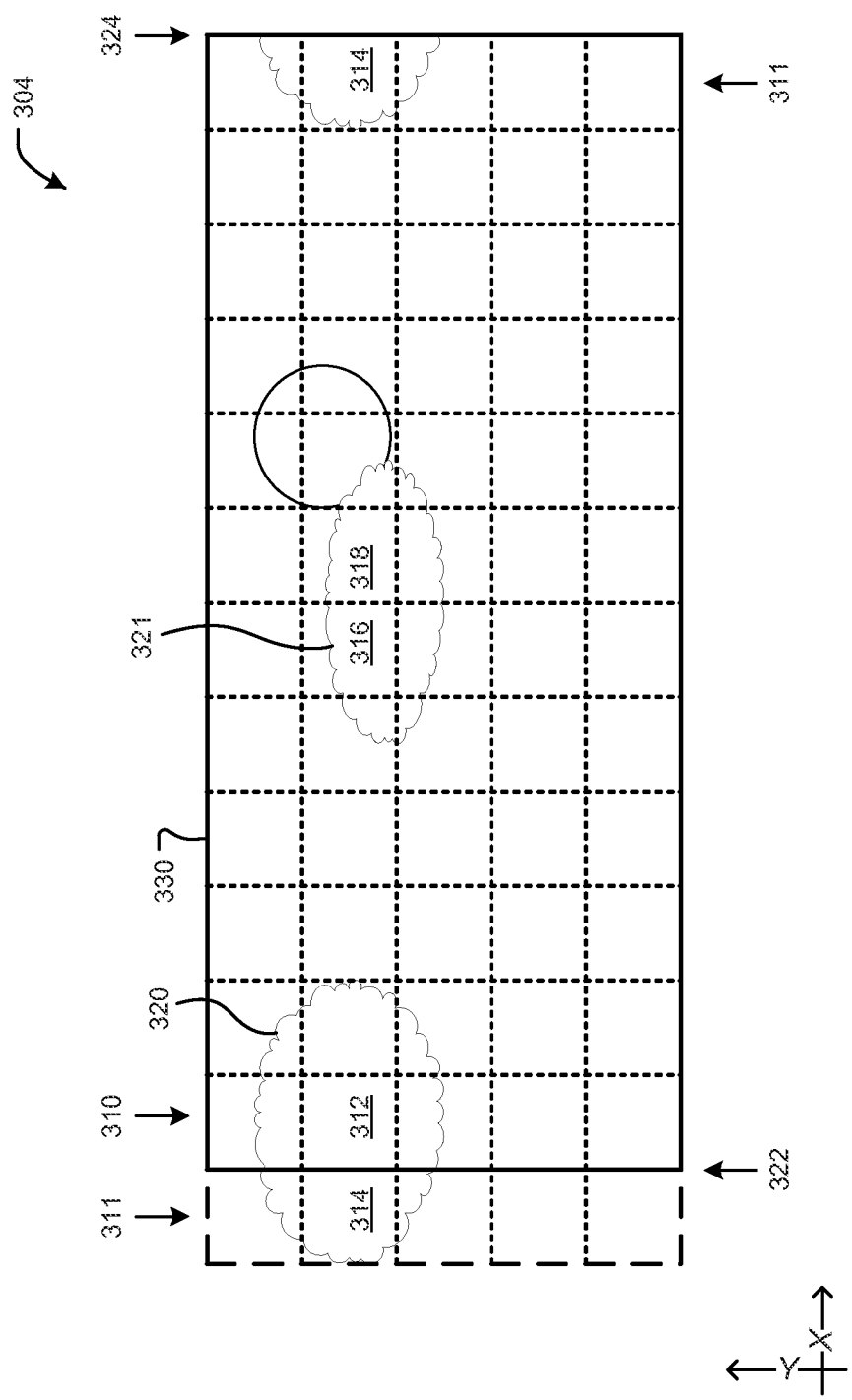
FIG. 6 is a diagram showing a frame illustrating one example of a cross-edge spatial continuity feature for compression.

In the various examples described herein, the image processor may compress video utilizing cross-edge features, such as cross-edge spatial continuities (e.g., i-frames) and cross-edge motion vectors (e.g., p-frames and/or b-frames). FIG. 6 is a diagram showing a frame 304 illustrating one example of a cross-edge spatial continuity feature for compression. The frame 304 is divided into blocks. Blocks may comprise a plurality of pixel values that are contiguous on the two-dimensional grid (e.g., represented by X and Y in FIG. 6. Blocks may be of any suitable size or shape. In some examples, blocks may be squares including, for example, 4×4 blocks of pixel values, 8×8 blocks of pixel values, 16×16 blocks of pixel values, etc. Non-square blocks may also be used in some examples such as, for example, 16×8 blocks, 8×16 blocks, etc. Also, blocks in some examples are not rectangular. Also, a 16×16 block of pixel values is sometimes referred to as a macroblock.

In FIG. 6, blocks 312, 314, 316, 318 are individually labeled. Additional unlabeled blocks are illustrated by the dashed grid on the frame 304. The frame 304 has a left edge 322 and a right edge 324. The frame 304 may be continuous in the X-dimension, similar to the frames 4a, 4b, 4c, 4n described herein. Accordingly, the frame 304 may be continuous across edges 322, 324. The blocks of the frame 304 may be arranged into columns including edge columns 310, 311. Edge column 310 may be adjacent to the edge 322. Edge column 311 may be adjacent to the edge 324. Although edge columns 310, 311 are one block wide, edge columns may be two or more blocks wide. In the representation of FIG. 6, edge column 311 is shown both at its actual position adjacent the edge 324 (e.g., within the solid frame perimeter line 330) and also in dashed form adjacent the opposite edge 322. An example spatial continuity feature is shown with reference to object 321, which may be a cloud. Block 316 comprises pixel values representing a portion of the cloud 321 and a portion of surrounding sky. Block 318 similarly comprises pixel values representing a portion of the cloud 321 and a portion of surrounding sky. Because blocks 316 and 318 represent similar portions of the cloud 321, constituent pixel values of the respective blocks 316, 318 may have similar values. In some examples, this may represent a spatial continuity feature between block 316 and block 318. For example, during compression, the image processor may replace subject block 318 with a reference to reference block 316. The reference may include a pointer to the reference block 316 as well as a description of the differences between the subject block 318 and the reference block 316. The description of differences between the subject block 318 and reference block 316 may be expressed in any suitable manner. For example, each pixel value in the subject block 318 may be represented by a coefficient or value representing a difference between that pixel value and a corresponding pixel value at the reference block 316. If a set of corresponding pixel values from the blocks 316, 318 have the same value, then no coefficient may be necessary for those pixel values. In some examples, the reference and subject blocks may be reversed. For example, the block 316 may be the subject block and may be replaced with a reference to the block 318.

The spatial continuity feature shown with respect to blocks 316, 318 is not a cross-edge spatial continuity feature because it does not cross the edges 322, 324 of the frame 304. Frame 304, however, also includes a cross-edge spatial continuity feature between blocks 312 and 314. For example, another object 320 shown in the frame 330 is a cloud that crosses the edges 322, 324. For example, block 312 in edge column 310 comprises pixel values representing one portion of the cloud 320. Block 314 in edge column 311 comprises pixel values representing another portion of the cloud 320. Because blocks 312 and 314 represent similar portions of the cloud 320, constituent pixel values of the respective blocks 312, 314 may have similar values. Accordingly, the image processor may identify block 314 as a reference block for block 312, which may be a subject block. During compression, the image processor may replace the subject block 312 with a reference to the reference block 314. Alternatively, the image processor may identify block 312 as a reference block for block 314, which may be the subject block. During compression, the image processor may replace the block 314 with a reference to the block 312.

Figure 7:
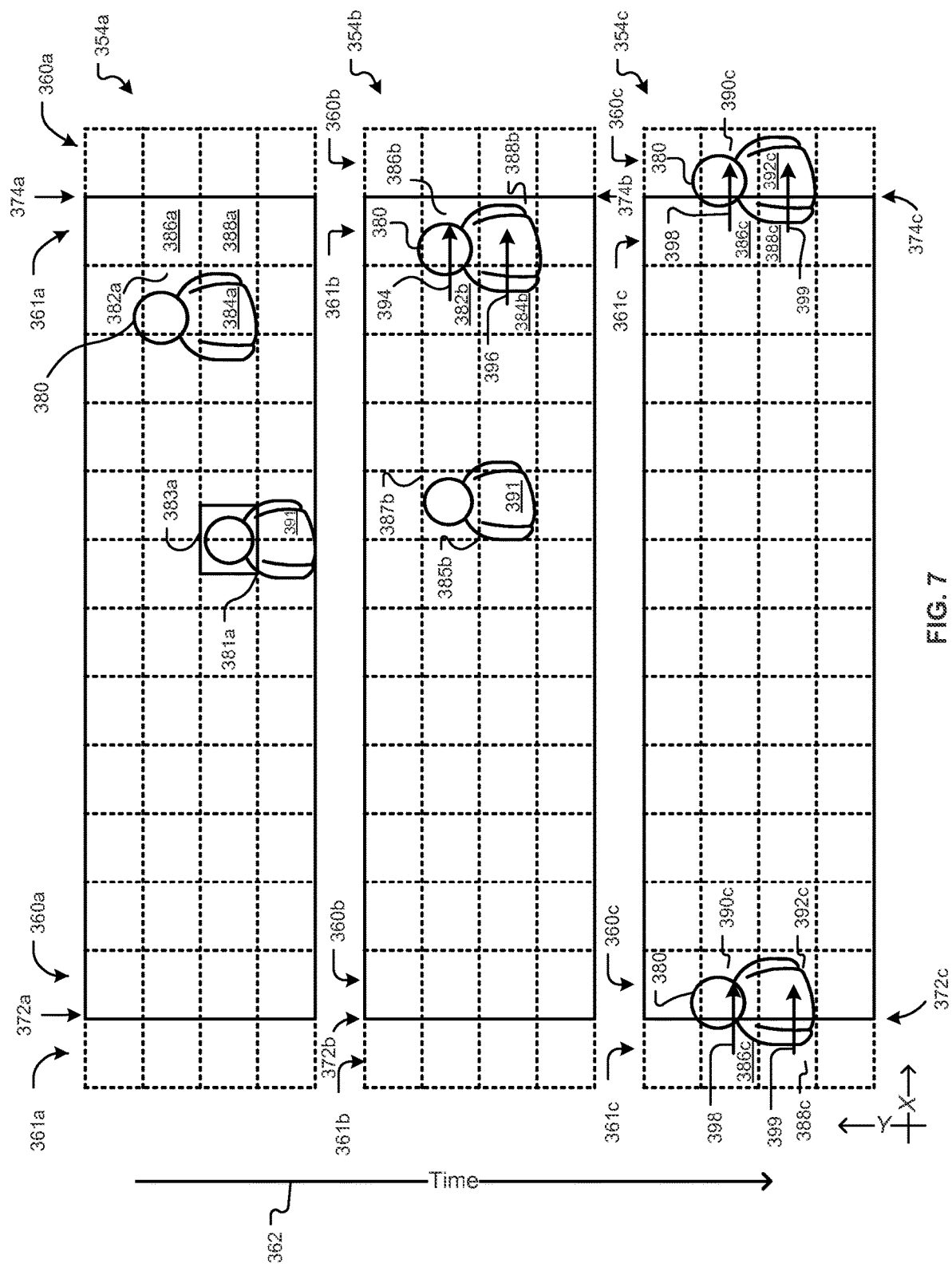
FIG. 7 is a diagram showing frames that illustrate one example of a cross-edge motion vector feature for compression.

FIG. 7 is a diagram showing frames 354a, 354b, 354c that illustrate one example of a cross-edge motion vector feature for compression. The frames 354a, 354b, 354c may be continuous in the X-dimension, similar to the frames 4a, 4b, 4c, 4n, 304 described herein. Like the frame 304, the frames 354a, 354b and 354c are divided into blocks. Blocks 382a-c, 384a-c, 386a-c, 388a-c, 390a-c, 392a-c are individually labeled. Additional unlabeled blocks are illustrated by the dashed grids on the frames 354a, 354b, 354c. Frame 354a, 354b and 354c may be consecutive frames according to a temporal sequence of frames of a video. For example, the frames may be ordered according to a time axis 362. Each frame 354a, 354b, 354c may have respective edges 372a-c and 374a-c and edge columns of blocks 360a, 360b, 360c and 361a, 361b, 361c. The edges 372a, 372b, 372c may equivalent positions on the two-dimensional grid. For example, the edges 372a, 372b, 372c may each correspond to a common position in the three-dimensional camera space, albeit different points in time 362. Similarly, the edges 374a, 374b, 374c may have equivalent positions on the two-dimensional grid. For example, the edges 374a, 374b, 374c may also correspond to the same position in the three-dimensional camera space, albeit again at different points in time 362.

The example frames 354a, 354b and 354c depict an example person 380 moving across the three-dimensional image space. When projected to the frame space, the person 380 moves from the negative X direction to the positive X direction (left-to-right in FIG. 7). Motion vectors 394, 396, 398, 399 are illustrated with reference to the person 380. Example motion vectors 394, 396 are shown in frame 354b and represent motion between the frame 354a and the frame 354b. For example, motion vector 394 points from block 382a to block 386b. This may indicate that what was depicted at the position of the block 382a at the previous frame 354a is shown at block 386b in the frame 354b. For example, at frame 354a, block 382a shows a portion of the head of the person 380. At frame 354b, the same portion of the head of the person 380 is shown at block 386b. Motion vector 396 points from block 384a to block 388b. This may indicate that what was shown at the position of block 384b at the previous frame 354a is shown at block 388b at the frame 354b. For example, at frame 354a, block 384a shows a portion of the torso of the person 380. At frame 354b, the same portion of the torso of the person 380 is shown at block 388b. Motion vectors 394, 396 may be used to compress the frame 354b. For example, a subject block 386b may be replaced with a reference to its reference block 382a. Similarly, a subject block 388b may be replaced with a reference to its reference block 384a. The references may include pointers or other indicators of the respective reference blocks 382a, 384a as well as descriptions of the differences between the respective subject and reference blocks.

The motion vectors 394, 396 do not cross any frame edges and, therefore, may not be cross-edge motion vector features. Motion vectors 398, 399 shown with reference to frame 354c, however, do cross frame edges 374b, 374c having equivalent positions on the two-dimensional grid. For example, the example person 380 may move to the right between frames 354b, 354c, crossing the edges 374b, 374c having equivalent positions on the two-dimensional grid. Accordingly, motion vector 398 may point from block 386b to block 390c. This may indicate that the object depicted by block 386b in the prior frame (frame 354b) is shown in block 390c in frame 354c. For example, blocks 386b and 390c may both depict the same portion of the head of the person 380. Similarly, motion vector 399 may point from block 388b to block 392c. This may indicate that the object depicted by block 388b in the prior frame 354b is shown in block 392c in frame 354c. Because blocks 390c, 392c are positioned on the opposite side of the frames 354*b*, 354*c* relative to the blocks 386*c*, 388*c*, the motion vectors 398, 399 cross edges 374*c*, 372*c* having equivalent positions on the two-dimensional grid and may be considered cross-edge motion vectors. During compression, blocks 390*c* and 392*c* may be subject blocks replaced by references to reference blocks 386*b*, 388*b*. The motion vectors shown in FIG. 7 are p-frame motion vectors because the motion vectors terminate in frames that are positioned after the originating frames according to the temporal sequence of the panoramic video. For example, the motion vector 398 begins at frame 354*b* (e.g., at block 386*b*) and terminates at frame 354*c* (e.g., at block 390*c*). In some examples, cross-edge motion vectors may be bi-directional or b-frames motion vectors that may include motion vectors that terminate at a frame positioned before the originating frame according to the video sequence. Also, the motion vector examples, in FIG. 7 move between adjacent blocks. In some examples, motion vectors may move between blocks that are not adjacent.

In some examples, a reference frame need not start at a particular grid position, as shown in FIG. 7. In some examples, the blocks shown in FIG. 7 may be 16×16 pixel values. Each block may be described by the location of its bottom left pixel value. For example, the block 386*b* is in the twelfth row of the frame 354*b* and the second column. Accordingly, the position of the block 386*b* may be at a position on the two-dimensional grid: (x, y)=(16×12, 16×2). Similarly, the reference block for block 386*b* (e.g., block 382*a*) is in the eleventh row of the frame 354*b* and the second column, making its position on two-dimensional grid: (x, y)=(16×11, 16×2). Accordingly, the motion vector 394 pointing from block 382*a* to block 386*b* may be (16, 0). In various examples, the reference block from a reference frame may be anywhere within a search window around the subject block (e.g., around the bottom left of the reference block). In one example, the search window may be (+/−64, 32). FIG. 7 shows another example of an object 391 (e.g., a person). A head 383*a* of the object 391 is at a position 381*a* that is at the halfway point of the relevant block, or at (16×7+8, 16). The motion vector for the subject block 385*b*, then, may be (8, 16). This indicates that the head 383*a* moved left by 8 pixel positions (e.g., ½ of one block) and up by 16 pixel positions (e.g., one block).

Figure 8:
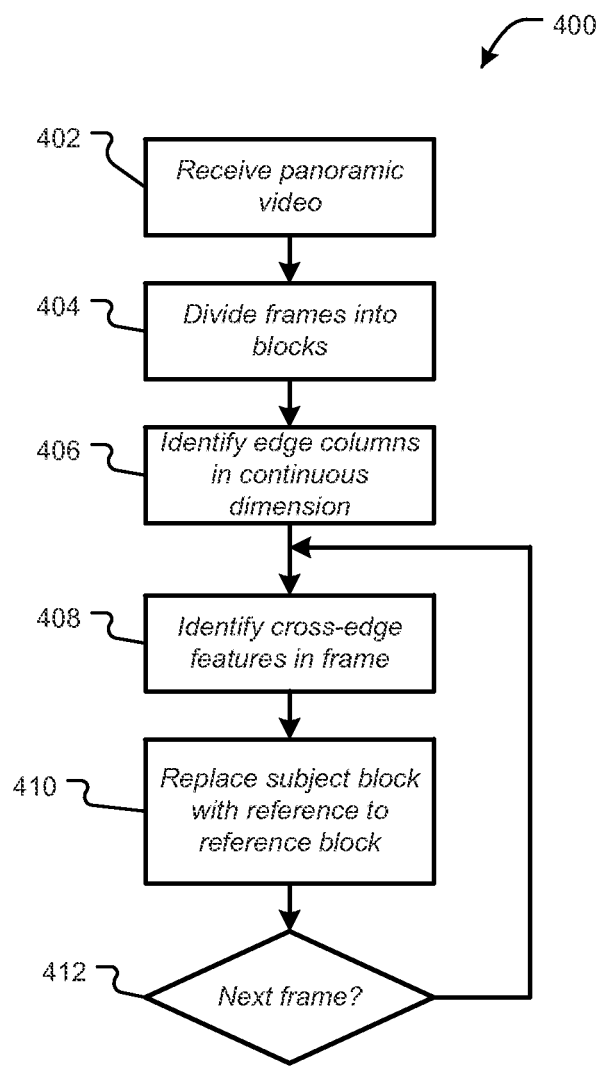
FIG. 8 is a flow chart showing one example of a process flow that may be executed by the image processor to compress video considering continuous frame edges and utilizing blocks.

FIG. 8 is a flow chart showing one example of a process flow 400 that may be executed by the image processor to compress video considering continuous frame edges and utilizing blocks. At 402, the image processor may receive a panoramic video comprising a plurality of frames. The panoramic video may be received in any suitable form. In some examples, the panoramic video may be or comprise a panoramic video file organized according to any suitable file system. The panoramic video file may comprise data describing the plurality of frames. At 404, the image processor may divide or otherwise partition the frames into blocks. At 406, the image processor may identify edge columns in the continuous dimension. Edge columns may be identified in any suitable manner. For example, the image processor may designate edge columns that are a predetermined number of pixel values and/or blocks wide.

At 408, the image processor may identify compression features including cross-edge features. The cross-edge features may include, for example, spatial continuity features, for example, as illustrated with respect to FIG. 6. In addition to or instead of spatial continuity features, the cross-edge features may include motion vector features, for example, as illustrated with respect to FIG. 7. For example, for a given subject block, the image processor may identify another block across the continuous edges of the subject frame that is similar or equal to the subject block. In some examples, for a given subject block, the image processor may identify another block across the continuous edges and present at a prior or subsequent frame according to the temporal sequence of the panoramic video.

At 410, the image processor may replace one or more subject blocks with references to corresponding reference blocks. For example, the reference blocks may be identified based on the cross-edge features identified at 408. When a spatial continuity feature has been found for a subject block, the corresponding reference block may be at another position in the subject frame. When a motion vector feature has been found for a subject block, the corresponding reference block may be in a prior or subsequent reference frame. The reference to the reference block may include a pointer or other data indicating the reference block, as described herein. In some examples, the reference may also include a description of a difference between the subject block and the reference block, also as described herein. In some examples, the image processor may also find spatial continuities and motion vectors that do not cross edges of the frame. Blocks that are the subject of these features may also be replaced with references to reference blocks. At 412, the image processor may determine whether there is an additional frame that has not yet been considered for compression. If so, the image processor may increment to the next frame and return to 408. Although the process flow 400 is described in terms of blocks, the image processor may be programmed to identify cross-edge features with respect to any other suitable sets of pixel values.

Replacing a pixel block or other set of pixel values with a reference to another pixel block or other set of pixel values may be performed in any suitable manner. In some examples, the image processor may write directly to a video file including the frame acted upon. For example, the image processor may receive the video file as input and provide as output a compressed copy of the same video file, with replaced pixel values overwritten. In other examples, the image processor, instead of overwriting an existing video file, may create a new compressed copy of the video file. In these examples, replacing a pixel block with a reference may comprise writing the reference to the compressed copy of the video file in place of writing the pixel block itself to the compressed copy of the video file. In examples where the image processor generates a new compressed copy of the video file, pixel blocks that are not replaced with references to other pixel blocks may be written directly to the compressed copy of the video file (e.g., copied from the original video file).

The frames 4*a*, 4*b*, 4*c*, 4*n* described in FIGS. 1-3 as well as the frames 304 and 354*a*, 354*b*, 354*c* described in FIGS. 6 and 7 are continuous in a single dimension (e.g., the X dimension). In some examples, however, a panoramic video may comprise frames that are continuous in both dimensions in the frame space. For example, FIG. 9 shows an environment 500 comprising a panoramic camera 502 for capturing panoramic video with frames continuous in two dimensions. For example, the panoramic camera 502 may comprise a field-of-view that is a full 4π steradians. A frame 504 may represent a spherical projection of the field-of-view of the camera into the two dimensional frame space. For example, in FIG. 9 the frame 504 is illustrated around the camera 502. FIG. 10 is a diagram showing a flattened view of the frame 504. The frame 504 may comprise four continuous edges 510, 511, 512, 513. For example, pixel values or blocks in an edge column 508 on one side of the frame 504 may depict portions of the camera space that are continuous with portions of the camera space depicted in the opposite edge column 508. Similarly, pixel values or blocks in the edge column 506 may also depict portions of the camera space that are continuous with portions of the camera space depicted in the opposite edge column 506. Accordingly, for purposes of finding compression features, the image processor may look for cross-edge features across the edges 512 and 513 as well as cross-edge features across the edges 510 and 511.

Figure 11:
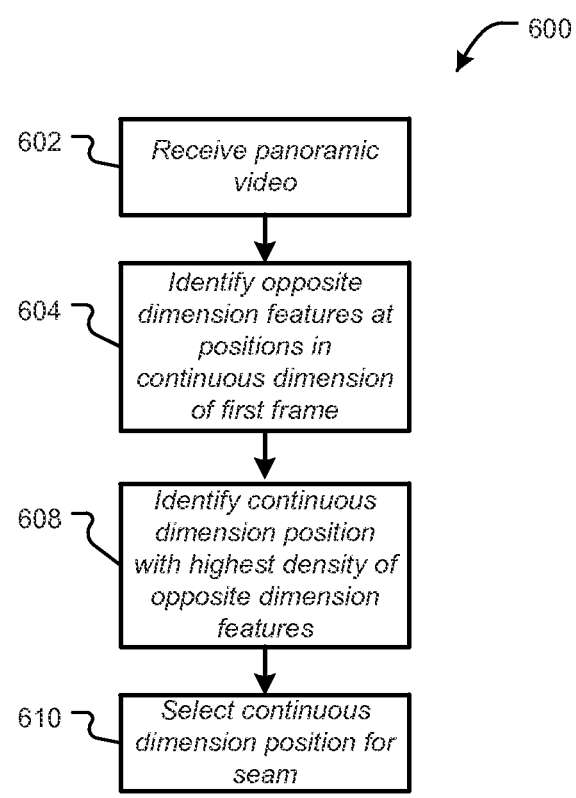
FIG. 11 is a flow chart showing one example of a flow chart that may be executed by the image processor to select a position of the seam in a frame of a panoramic video.

Referring again to FIG. 1, in some examples, the image processor may be utilized to select the position of the seam 8 of a panoramic frame so as to optimize compression. For example, the image processor may be programmed to select a position of the seam 8 that minimizes the number of cross-edge compression features. FIG. 11 is a flow chart showing one example of a flow chart that may be executed by the image processor to select a position of the seam 8 in a frame of a panoramic video. At 602, the image processor may receive a panoramic video. The panoramic video may comprise frames that are continuous in at least one dimension. For example, the panoramic video may comprise frames that are continuous in a single dimension similar to the frames 4a, 4b, 4c, 4n, 304, 354a, 354b, 354c described herein.

At 604, the image processor may identify opposite direction compression features at positions in the continuous dimension. For example, in FIG. 2, the frame 4a is continuous in the X dimension. The image processor may identify compression features that are in or approximately in the Y dimension. Any suitable compression feature may be used including, for example, spatial continuity features (e.g., i-frames) as described in FIG. 6 as well as motion vector (e.g., p-frames and/or b-frames) as described in FIG. 7. Compression features found at 604 may be found without regard to the position of the seam 8 and the edges 22, 24. Compression features in the Y dimension may include compression features that are directed parallel to or approximately parallel to the Y-axis. For example, a spatial continuity feature may be directed in the Y dimension if a line between the subject and reference blocks is parallel to or approximately parallel to the Y-axis. Also, for example, a motion vector feature may be in the Y dimension if the corresponding motion vector is parallel to or approximately parallel to the Y-axis. Although the frame 4a is continuous in the X dimension, the process flow 600 may also be utilized for frames continuous in the Y dimension. For example, for such a frame, the image processor may identify compression features that are in the X dimension.

At 608, the image processor may identify a continuous dimension position having the highest density of opposite dimension features. In the example of FIG. 2, this may include finding the X dimension position having the highest density of features in the Y dimension. The highest density of opposite dimension features may be found in any suitable manner. For example, the image processor may find a column of pixel values or blocks in the frame having the highest number of features that both originate and terminate in that column. Also, in some examples, the image processor may identify the column of pixel values or blocks that have the highest number of features that originate and terminate within a threshold number of columns (e.g., 5 columns or 10 columns). At 610, the image processor may set the seam for the frame at the position identified at 608. For example, setting the seam may comprise setting the edges of the frame adjacent on either side of the seam position at the edges of the two dimensional grid. Once the seam is set, the image processor may compress the frame. The frame may be compressed considering cross-edge features, as described herein, or may be compressed without considering cross-edge features. In some examples, the process flow 600 may be executed for every frame in a panoramic video. For example, each frame in the panoramic video may have its edges and seam positioned at different locations depending on the compression features of the constituent pixel values of the frame.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer readable medium for use by or in connection with an instruction execution system such as a processing component in a computer system. In this sense, the logic may comprise, for example, statements including instructions and declarations that can be fetched from the computer readable medium and executed by the instruction execution system. In the context of the present disclosure, a "computer readable medium" can be any medium that can contain, store, or maintain the logic or application described herein for use by or in connection with the instruction execution system. The computer readable medium can comprise any one of many physical media such as magnetic, optical, or semiconductor media. More specific examples of a suitable computer readable media include, but are not limited to, magnetic tapes, magnetic floppy diskettes, magnetic hard drives, memory cards, solid-state drives, USB flash drives, or optical discs. Also, the computer readable medium may be a random access memory (RAM) including, for example, static random access memory (SRAM) and dynamic random access memory (DRAM), or magnetic random access memory (MRAM). In addition, the computer readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method for compressing video, the method comprising:
   receiving, by an image processor, a panoramic video file, wherein receiving the panoramic video file comprises receiving frame data describing a plurality of frames;
   selecting a subject frame from the panoramic video file, wherein the subject frame comprises a first plurality of pixel values corresponding to positions on a two-dimensional grid, wherein the first plurality of pixel values depict a cylindrical projection of a 360° field-of-view;
   dividing, by the image processor, the subject frame into a first plurality of macroblocks, wherein each macroblock of the first plurality of macroblocks comprises a set of pixel values that are selected from the first plurality of pixel values and that correspond to contiguous positions in the two-dimensional grid, and wherein the first plurality of macroblocks comprises a subject frame left column of macroblocks positioned adjacent to a left edge of the subject frame and a subject frame right column of macroblocks positioned adjacent a right edge of the subject frame;
   identifying, by the image processor, cross-edge spatial continuity between a first macroblock in the subject frame left column of macroblocks and a second macroblock in the subject frame right column of macroblocks, wherein identifying the cross-edge spatial continuity comprises identifying a similarity between first pixel values of the first macroblock and second pixel values of the second macroblock;
   receiving a subsequent frame of the panoramic video file, wherein the subsequent frame comprises a second plurality of pixel values corresponding to positions on the two-dimensional grid, and wherein the subsequent frame is positioned immediately after the subject frame according to a temporal sequence of frames of the panoramic video file;
   dividing, by the image processor, the subsequent frame into a second plurality of macroblocks, wherein the second plurality of macroblocks comprises a subsequent frame left column of macroblocks positioned on a left side of the subsequent frame and a subsequent frame right column of macroblocks positioned on a right side of the subsequent frame;
   identifying, by the image processor, a first motion vector between a first initial position including a portion of a subject frame right column macroblock to a first next position including a portion of a subsequent frame left column macroblock; and
   generating a compressed copy of the panoramic video file, wherein generating the compressed copy of the panoramic video file comprises:
      writing the second macroblock in the subject frame right column of macroblocks to the compressed copy of the panoramic video file; and
      for the first macroblock in the subject frame left column of macroblocks, writing a cross-edge reference to the second macroblock in the subject frame right column of macroblocks, wherein the cross-edge reference comprises a first pointer to the second macroblock and difference data describing a difference between the first macroblock and the second macroblock; and
      replacing, by the image processor, the subject frame right column macroblock with a second reference to the subsequent frame left column macroblock, wherein the second reference comprises a second pointer to the subsequent frame left column macroblock and second difference data describing a second difference between the subject frame right column macroblock and the subsequent frame left column macroblock.

2. The method of claim 1, wherein the panoramic video file further comprises a prior frame, wherein the prior frame comprises a third plurality of pixel values corresponding to positions on the two-dimensional grid, and wherein the prior frame is positioned immediately before the subject frame according to the temporal sequence of frames of the panoramic video file, the method further comprising:
   dividing, by the image processor, the prior frame into a third plurality of macroblocks, wherein the third plurality of macroblocks comprises a prior frame left column of macroblocks positioned on a left side of the prior frame and a prior frame right column of macroblocks positioned on a right side of the prior frame;
   identifying, by the image processor, a second motion vector between a second initial position including a portion of a prior frame right column macroblock to a second next position including a portion of a second subject frame left column macroblock; and
   replacing, by the image processor, the second subject frame left column macroblock with a third reference to the prior frame right column macroblock, wherein the third reference comprises a third pointer to the prior frame right column macroblock and third difference data describing a second difference between the second subject frame left column macroblock and the prior frame right column macroblock.

3. A system for compressing video, the system comprising:
   an image processor, the image processor comprising at least one processor and operatively associated non-transitory memory, wherein the image processor is programmed to:
      receive a first frame comprising a plurality of pixel values arranged according to a two-dimensional grid;
      determine a first pixel block positioned in a first edge column adjacent a first edge of the first frame;
      determine a second pixel block positioned in a second edge column adjacent a second edge of the first frame opposite the first edge;
      identify a spatial continuity between the first pixel block and the second pixel block;

replace the first pixel block positioned in the first edge column adjacent the first edge of the first frame with a first cross-edge reference to the second pixel block positioned in the second edge column adjacent the second edge of the first frame opposite the first edge;

receive a second frame, wherein the second frame is after the first frame according to a first temporal sequence of a video comprising the first frame and the second frame;

determine a third pixel block positioned in a third edge column adjacent a first edge of the second frame, wherein the first edge of the second frame and the first edge of the first frame have equivalent positions on the two-dimensional grid;

identify a first motion vector between the third pixel block and a fourth pixel block selected from the second edge column of the first frame; and replace the fourth pixel block with a second cross-edge reference to the third pixel block.

4. The system of claim 3, wherein the image processor is further programmed to:

receive a third frame, wherein the third frame is prior to the first frame according to a second temporal sequence of the video further comprising the third frame;

determine a fifth pixel block positioned in a fourth edge column adjacent a first edge of the third frame, wherein the first edge of the third frame and the first edge of the first frame have equivalent positions on the two-dimensional grid;

identify a second motion vector between the fifth pixel block and a sixth pixel block selected from the second edge column of the first frame; and replace the sixth pixel block with a third cross-edge reference to the fifth pixel block.

5. The system of claim 4, wherein the third frame is adjacent the first frame according to the second temporal sequence of the video.

6. The system of claim 3, wherein the first cross-edge reference to the second pixel block comprises an indication of the first pixel block and difference data describing a difference between the first pixel block and the second pixel block.

7. The system of claim 3, wherein the image processor is further programmed to:

determine a fifth pixel block positioned in a first edge row adjacent a third edge of the first frame;

determine a sixth pixel block positioned in a second edge row adjacent a fourth edge of the first frame opposite the third edge;

identify a second spatial continuity between the fifth pixel block and the sixth pixel block; and replace the fifth pixel block with a third cross-edge reference to the sixth pixel block.

8. The system of claim 3, wherein the first pixel block comprises a 16 by 16 square of pixel values selected from the plurality of pixel values.

9. The system of claim 3, wherein identifying the spatial continuity between the first pixel block and the second pixel block comprises determining that at least one pixel value of the first pixel block is equal to at least one pixel value of the second pixel block.

10. A method comprising:

receiving a first frame comprising a plurality of pixel values arranged according to a two-dimensional grid;

determining a first pixel block positioned in a first edge column adjacent a first edge of the first frame;

determining a second pixel block positioned in a second edge column adjacent a second edge of the first frame opposite the first edge;

identifying a spatial continuity between the first pixel block and the second pixel block;

replacing the first pixel block positioned in the first edge column adjacent the first edge of the first frame with a first cross-edge reference to the second pixel block positioned in the second edge column adjacent the second edge of the first frame opposite the first edge;

receiving a second frame, wherein the second frame is after the first frame according to a first temporal sequence of a video comprising the first frame and the second frame;

determining a third pixel block positioned in a third edge column adjacent a first edge of the second frame, wherein the first edge of the second frame and the first edge of the first frame have equivalent positions on the two-dimensional grid;

identifying a first motion vector between the third pixel block and a fourth pixel block selected from the second edge column of the first frame; and replacing the fourth pixel block with a second cross-edge reference to the third pixel block.

11. The method of claim 10, further comprising:

receiving a third frame, wherein the third frame is prior to the first frame according to a second temporal sequence of the video further comprising the third frame;

determining a fifth pixel block positioned in a fourth edge column adjacent a first edge of the third frame, wherein the first edge of the third frame and the first edge of the first frame have equivalent positions on the two-dimensional grid;

identifying a second motion vector between the fifth pixel block and a sixth pixel block selected from the second edge column of the first frame; and replacing the sixth pixel block with a third cross-edge reference to the fifth pixel block.

12. The method of claim 11, wherein the third frame is adjacent the first frame according to the second temporal sequence of the video.

13. The method of claim 10, wherein the second cross-edge reference to the third pixel block comprises an indication of the fourth pixel block and difference data describing a difference between the third pixel block and the fourth pixel block.

14. The method of claim 10, wherein the first cross-edge reference to the second pixel block comprises an indication of the first pixel block and difference data describing a difference between the first pixel block and the second pixel block.

15. The method of claim 10, further comprising:

determining a fifth pixel block positioned in a first edge row adjacent a third edge of the first frame;

determining a sixth pixel block positioned in a second edge row adjacent a fourth edge of the first frame opposite the third edge;

identifying a second spatial continuity between the fifth pixel block and the sixth pixel block; and replacing the fifth pixel block with a third cross-edge reference to the sixth pixel block.

16. The method of claim 10, wherein the first pixel block comprises a 16 by 16 square of pixel values selected from the plurality of pixel values.

17. The method of claim 10, wherein identifying the spatial continuity between the first pixel block and the second pixel block comprises determining that at least one pixel value of the first pixel block is equal to at least one pixel value of the second pixel block.

* * * * *